United States Patent [19]
Banba et al.
[11] Patent Number: 4,558,446
[45] Date of Patent: Dec. 10, 1985

[54] MEMORY SYSTEM

[75] Inventors: Fumiyasu Banba, Hadano; Mikito Ogata, Odawara, both of Japan

[73] Assignee: Hitachi, Ltd., Tokyo, Japan

[21] Appl. No.: 491,590

[22] Filed: May 4, 1983

[30] Foreign Application Priority Data

May 7, 1982 [JP] Japan .............................. 75213

[51] Int. Cl.$^4$ .................. G11B 5/09; G06F 11/00
[52] U.S. Cl. .............................. 371/10; 360/53
[58] Field of Search .................. 371/10; 365/200; 360/47, 53; 364/200, 900

[56] References Cited

U.S. PATENT DOCUMENTS

| | | | |
|---|---|---|---|
| 3,422,402 | 1/1969 | Sakalay | 371/10 |
| 4,214,280 | 7/1980 | Halfhill et al. | 360/53 |
| 4,420,807 | 12/1983 | Nolta et al. | 365/200 X |
| 4,434,487 | 2/1984 | Rubinson et al. | 371/10 |
| 4,473,895 | 9/1984 | Tatematsu | 365/200 |

*Primary Examiner*—Charles E. Atkinson
*Attorney, Agent, or Firm*—Antonelli, Terry & Wands

[57] ABSTRACT

In prior art memory systems, if a defective area of the recording medium is accessed for reading, an alternative area for compensating the defective area is read out. According to this invention, information recorded in the alternative area is stored in advance in a separate high-speed memory device and it is read out when the alternative area is requested to be read out.

4 Claims, 5 Drawing Figures

MEMORY 55
REGISTER 50
CHECK CODE GENERATOR 66
ADDER 57
ADDER 65
ERROR DETECTION/ CORRECTION CIRCUIT 61
MEMORY 60
COUNTER 59
COUNTER 67
REGISTER 56
COMPARATOR 58
CONTROLLER 51
MEMORY 71
MEMORY 73
MEMORY 72
COMPARING/ DETECTING CIRCUIT 70
WRITE/READ CIRCUIT 92
REGISTER 62
REGISTER 64
COUNTER 63
REGISTER 68
COMPARATOR 69
SECTOR RANGE REGISTER 53
HEAD DRIVER 91

CHECK CODE GENERATOR
REGISTER
ERROR DETECTION/ CORRECTION CIRCUIT
MEMORY
COMPARING/ DETECTING CIRCUIT
COUNTER
ADDER
COMPARATOR
CONTROLLER
SECTOR RANGE REGISTER
WRITE/READ CIRCUIT
HEAD DRIVER

MEMORY SYSTEM

BACKGROUND OF THE INVENTION

1. Field of the Invention

The present invention relates to a memory system such as a photo-disk memory and, particularly, to a memory system capable of high-speed reading even if the information recording area includes defective portions.

2. Description of the Prior Art

In the conventional magnetic disk memory, when the system has read out a defective area, e.g., a defective area due to a defect in the recording medium, the system always reads an alternative area which is intended to replace the defective area for compensating for the defect. The alternative area is generally located at a distance of several tracks, for example, from the defective area, and it takes a considerable time for positioning the reading head to the alternative area. Particularly, the photo-disk memory takes a positioning time about ten times longer than that of the magnetic disk memory due to the restrictions on the structure.

SUMMARY OF THE INVENTION

It is an object of the present invention to provide a memory system which performs high-speed reading for the alternative area when a defective area is accessed for reading.

The present invention resides characteristically in a memory system having an information recording area and alternative area to be used for a defective area which might exist in the information recording area, wherein a copy of information recorded in the alternative area is stored in another memory device which can be read at a higher speed than the alternative area is directly read out, and information stored in that memory device is read out when access is made to the defective area.

DESCRIPTION OF THE PREFERRED EMBODIMENTS

Figure 1:
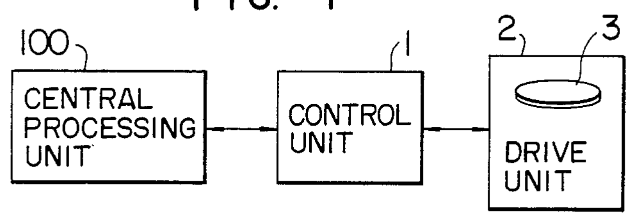
FIG. 1 is a block diagram of a computer system including a disk memory.

The following describes one embodiment of the present invention. FIG. 1 is a block diagram showing a computer system including a disk memory. The disk memory consists of a control unit 1 and a drive unit 2. The drive unit 2 functions to rotate a magnetic or photo disk 3 mounted thereon and to write and read information to and from the disk 3. The control unit 1 is directed by a central processing unit 100 to control the operation of the drive unit 2 and data transmission between the central processing unit and the drive unit 2. The foregoing system configuration is well known in this field of art.

Figure 2:
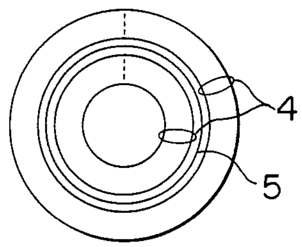
FIG. 2 is a diagram for explaining the arrangement of the tracks on the disk.

FIG. 2 shows the arrangement of tracks on the disk used in this embodiment. The disk has a plurality of tracks for recording information, and the tracks are divided into a track portion 4 used for the normal data recording and an alternative track portion 5. The alternative track portion 5 has a single track in this embodiment. Each track is divided into a plurality of small areas called sectors.

Figure 3:
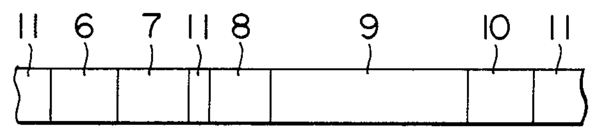
FIGS. 3 and 4 are diagrams showing the recording format of the sector.

FIG. 3 shows the recording format for the sectors in the track portion 4 shown in FIG. 2. The format includes a sector mark section 6 indicating the top of a sector, a sector address section 7 for identification of the sector, a write flag section 8 indicating that the sector stores information, a data section 9 storing data sent from the central processing unit, a data check code section 10 used for correcting a recoverable error detected in the data section 9, and a gap 11 recording no information. The sector format may include other sections of information, and such sections unrelated to the present invention are not explained here.

Figure 4:
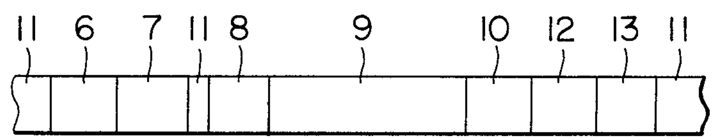

FIG. 4 shows the recording format for the sectors in the alternative track portion 5 shown in FIG. 2. The sector of the alternative track portion has the same sections as those of the track portion 4 shown in FIG. 3, and they are referred to by the common reference numbers. The sector of FIG. 4 is used to record data in place of a sector in the track portion 4 which is found to be defective, and will be termed an alternative sector. The alternative sector differs from the normal sector shown in FIG. 3 in that it additionally has a defective sector address section 12 for recording the address of the defective sector replaced by the alternative sector, and a defective sector address check code section 113 used for correcting a correctable error detected in the defective sector address section 12, following the data check code section 10.

The sector address section 7 in FIGS. 3 and 4 is made up of a track number for addressing the track and a sector number for addressing the sector within the track. The sector number is numbered sequentially from the top sector on each track. In this embodiment, the sector mark section 6 and the sector address section 7 are recorded during the manufacturing process of the disk, and the following description is based on the assumption that the read error does not occur in these sections.

Figure 5:
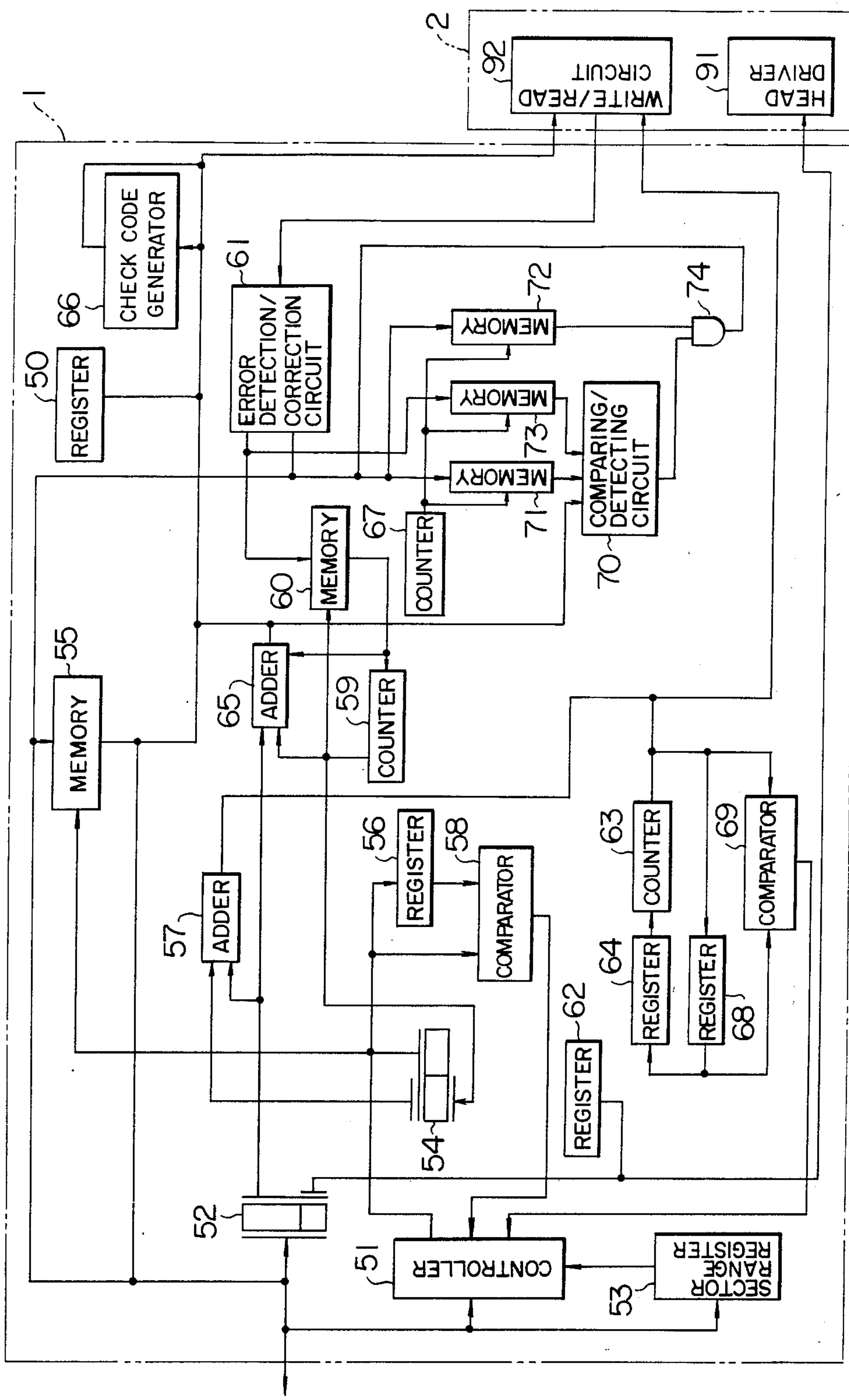
FIG. 5 is a block diagram showing in detail the control unit and disk drive unit according to the present invention.

FIG. 5 shows in detail the control unit 1 and drive unit 2 embodying the present invention. When the central processing unit makes access to the disk memory unit, it first gives the address command for specifying a sector to be accessed, and then gives the write command or read command for specifying writing or reading. When the write command is given, write data is transferred from the central processing unit to the control unit 1. The address command indicates the address of the sector which is first accessed and the number of sectors to be accessed. The number of sectors to be accessed may be one or more than one, and for a plurality of sectors in this embodiment, they must be located within the same track. Sectors specified by the address command are sectors within the track portion 4 in FIG. 2.

Commands issued by the central processing unit are received by a controller 51, which controls the operation of the whole system including the drive unit 2 in accordance with the commands. In FIG. 5, all signal lines connected between the controller 51 and devices controlled by it are omitted for purposes of simplicity.

On receiving the address command, the controller 51 sets the sector address and the number of sectors in the command to a sector address register 52 and sector range register 53, respectively. The track number in the sector address register 52 is indicated to a head driver 91 within the drive unit 2, whereby the head driver 91 brings the head over the track of the disk specified by the track number. The track is one of the tracks within the track portion 4 in FIG. 2. On completion of the head positioning operation, the controller 51 informs the central processing unit that the execution of the address command has been completed. In response to the signal, the control processing unit sends the write command or read command to the control unit 1. The following describes the case where the central processing unit issues the write command.

Memory 55 is a 1-byte word memory, and is made up of high-speed IC memory devices. Assuming the number of sectors on each track within the track portion 4 in FIG. 2 to be 64 and the number of bytes of data recorded in the data section of each sector to be 512, the memory 55 has a capacity of 32768 bytes. Counter 54 is a 15-bit counter. When the controller 51 receives the write command, it first clears the counter 54. Then, write data sent from the central processing unit is stored in byte units in memory locations of the memory 55 addressed by the counter 54. The counter 54 is incremented by one each time a write operation for a byte has taken place. The controller 51 detects that all write data from the central processing unit has been written in the memory 55, and the immediate contents of the counter 54, which have been incremented by the write operation for the last byte of data, are transferred to a register 56. At this time, the counter 54 indicates a number which is equal to the number of bytes written in the memory 55. The number of bytes of write data sent from the central processing unit does not need to be a multiple of 512.

After the head positioning operation by the head driver 91 and the data write operation by the memory 55 have been completed, the counter 54 is cleared so that the top address of the sector address register 52 is indicated. After that, the high order 6 bits of the counter 54 are added to the contents of the sector address register 52 by an adder 57, and the output of the adder 57 is fed to a write/read circuit 92 in the drive unit 2. At this time, the output of the adder 57 indicates the top address of the sector to be written. The write/read circuit 92 is arranged to read out the sector address section of a sector when it detects a sector mark in either of writing data to the disk or reading data from the disk.

On detecting the sector address coincident with the output of the adder 57, the write/read circuit 92 fills the write flag of that sector with a certain bit code, writes into the data section of that sector 512 bytes of data read out of the memory 55, and writes into the data check code section of that sector the output from a check code generator 66. The check code generator 66 produces error check codes for verification of write data. Reading of 512-byte data from the memory 55 may be carried out by reading memory locations addressed by the counter 54 and incrementing the counter 54 cyclically until the low order 9 bits of the counter 54 becomes zero again, at which time the high order 6-bit portion is incremented by one.

During the foregoing operation, the contents of the counter 54 are compared with the contents of the register 56 by a comparator 58. In case the low order 9 bits of the counter 54 become zero before the comparator 58 outputs a coincidence signal, the high order 6 bits of the counter 54 are added to the contents of the sector address register 52 by the adder 57, and the next 512 bytes of data read out of the memory 55 are recorded in the next sector in the same way as that of the first 512-byte data. On the other hand, if the comparator 58 outputs a coincidence signal before the low order 9 bits of the counter 54 become zero, it means that all write data from the central processing unit have been stored on the disk before the end of the 512-byte recording. In this case, the write/read circuit 92 is supplied with fixed data from a register 50 in place of write data from the memory 55 until the low order 9 bits of the counter 54 become zero, whereby the write/read circuit 92 always writes 512 bytes of data on the disk. In case the comparator 58 provides a coincidence signal at an exact time when the low order 9 bits of the counter 54 become zero, the register 50 does not provide the fixed data. The controller 51 terminates the write operation on condition that the comparator 58 has issued the coincidence signal and the coincidence of the sector range register 53 with the high order 6 bits of the counter 54 is detected.

For the verification of the write operation, subsequently to the write operation, the checking operation takes place immediately as follows. Reference number 59 denotes a 6-bit counter, and 60 denotes a memory which can be accessed for each bit. The memory 60 has a number of bits equal to the number of sectors (64) on each track in the track portion 4, and is made up of high-speed IC memory devices. Initially, the counters 54 and 59, and the memory 60 are cleared. The high order 6 bits of the counter 54 is added to the contents of the sector address register 52, and the output of the adder is fed to the write/read circuit 92 as in the case of the write operation. The output of the adder 57 at this time indicates the top address of the sector containing the data which has been written by the write command. The write/read circuit 92 tests the sector address section which appears next to the sector mark, and if the sector address coincident with the output of the adder 57 is detected, the circuit 92 reads the write flag section, data section and data check code section of that sector and sends them to an error detection/correction circuit 61. The circuit 61 checks to see whether the write flag has the specified bit code, and also checks the data section based on the contents of the data check code section. If the write flag does not have the specified code, or if the data section includes an uncorrectable error, the error detection/correction circuit 61 outputs the error signal indicating that the sector is defective. If the error signal is issued, the memory bit position in memory 60 addressed by the counter 59 is set to "1", and if the error signal is not issued, the bit position is reset to "0". The counter is incremented at the same frequency as in the write operation and its high order 6-bit portion is incremented by one before the sector mark of the next sector comes to the head position. The counter 59 is incremented by one each time the memory 60 is written once.

During the foregoing operation, the contents of the counter 54 are compared with the contents of the register 56 by the comparator 58. If the low order 9 bits of the counter 54 become zero before the comparator 58 outputs the coincidence signal, the new contents of the high order 6 bits of the counter 54 are added to the contents of the sector address register 52, and the new sector is checked for defectiveness, and the result is set into the memory 60. The controller 51 terminates the checking operation on condition that the comparator 58 has issued the coincidence signal and the coincidence of the high order 6 bits of the counter 54 with the contents of the sector range register 53 is detected. At the end of the checking operation, the bit position of the memory 60 corresponding to the defective section is set to "1".

The foregoing checking operation is immediately followed by the write operation for the alternative sector so as to replace defective sectors as follows. A register 62 contains the track number of the alternative track. The head driver 91 is given the contents of the register 62 instead of the track number from the sector address register 52, and brings the head over the track specified by the track number. Alternative sectors on the alternative track are used in the order of alignment on the track, and the top address of unused alternative sectors is set in a register 68. Reference number 63 denotes a 6-bit counter.

Upon completion of the head positioning operation by the head driver 91, the counter 59 is first cleared, and then the contents of the register 68 are transferred through a register 64 to the counter 63. The contents of the counter 63 are fed to the write/read circuit 92 in place of the output from the adder 57. On detecting the sector address coincident with the contents of the counter 63, the write/read circuit 92 fills the write flag of the alternative sector with the specified bit code and also writes the data section, data check code section, defective sector address section and defective sector address check code section as follows.

The bit position of the memory 60 addressed by the counter 59 is read out. If the bit is found to be "0", the counter 59 is incremented by one, or if the bit is found to be "1", the counter 59 is not incremented and is held unchanged. The reading of the memory 60 and incrementing of the counter 59 are carried out at a high speed, and it takes very little time before the incrementing operation for the counter 59 is suspended as compared with the time needed for the disk to make a revolution. If the memory 60 reads out "1", the contents of the counter 59 are transferred to the high order 6 bits of the counter 54. Then, the memory location 55 addressed by the counter 54 is read and the counter 54 is incremented cyclically until the low order 9 bits of the counter 54 become zero again, whereby 512 bytes of data are read out of the memory 55 and sent through the check code generator 66 to the write/read circuit 92. After that, the contents of the sector address register 52 are added to the contents of the counter 59 by an adder 65, and its output is fed through the check code generator 66 to the write/read circuit 92. In this way, the write/read circuit 92 records 512-byte data and its error check code obtained based on the read data from the memory 55 in the data section and data check code section, respectively, and records the defective sector address and its error check code obtained based on the output from the adder 65 in the defective sector address section and defective sector address check code section, respectively. After one alternative sector has been recorded, the counters 59 and 63 are incremented by one. Incrementing of the counter 59 is suspended again when the memory 60 reads out "1", and the next alternative sector is recorded in the same way as before.

During the foregoing operation, the contents of the counter 54 are compared with the contents of the register 56 by the comparator 58, and if the comparator 58 outputs the coincidence signal before the low order 9 bits of the counter 54 becomes zero, the write/read circuit 92 is supplied with the fixed data from the register 50 instead of read data from the memory 55 until the low order 9 bits of the counter 54 become zero. The operations at this time are identical to those of the write operation. The controller 51 terminates the write operation for the alternative sectors on condition that the comparator 58 has issued the coincidence signal and the coincidence of the contents of the sector range register 53 with the value indicated by the high order 6 bits of the counter 54 is detected. At this moment, the register 64 retains the top address of the alternative sectors which have been written, and the register 68 retains the top address of unused alternative sectors.

The foregoing write operation for the alternative sectors is immediately followed by the checking operation for the verification of writing to the alternative sectors as follows.

First, the contents of the register 64 are transferred to the counter 63, and then fed to the write/read circuit 92. On detecting the sector address coincident with the contents of the counter 63, the write/read circuit 92 reads the write flag section, data section, data check code section, defective sector address section and defective sector addresses check code section of that alternative sector, and sends them to the error detection/correction circuit 61. The error detection/correction circuit 61 tests whether the write flag section has the specified contents, and also checks the data section and defective sector address section based on the contents of the data check code section and defective section address check code section, respectively. If the write flag section does not contain the specified information or if the data section includes an uncorrectable error, or if the defective sector address section includes an uncorrectable error, the circuit 61 issues the error signal indicating that the alternative sector is defective. After one alternative sector has been read out, the counter 63 is incremented by one on condition that the error detection/correction circuit 61 does not output the error signal, and control proceeds to the reading for the next alternative sector. However, if the error signal is issued, the write operation for the alternative sectors is started from the very beginning. Even in this case, the contents of the register 68 are transferred to the counter 63 through the register 64, and there is no possibility of writing data again to the alternative sector which has been found to be defective. During the checking operation for the alternative sectors, the contents of the counter 63 are compared with the contents of the register 68 by a comparator 69. If the comparator 69 outputs the coincidence signal without any error signal issued by the error detection/correction circuit 69, it means that all alternative sectors are written correctly, and the controller 51 terminates the checking operation for the alternative sectors. These are the operations for executing the write command. At the end of the checking operation for the alternative sectors, the controller 51 informs the central processing unit that the execution of the write command has been completed. Then, the controller 51 performs the read operation for the alternative sectors by itself. This operation is as follows.

Reference number 71 denotes a memory for storing 15-bit words as many as the number of alternative sectors included in the alternative track portion 5 in FIG. 2, 72 is a memory for storing 512-byte blocks as many as the number of words stored in the memory 71, and 73 is a memory for storing 1-bit words as many as the number of words stored in the memory 71, each made up of high-speed IC memory devices. The word locations of the memories 71 and 73, and the block location of the memory 72 are addressed by a counter 67 simultaneously. Prior to the read operation for the alternative sectors, the counters 63 and 67 are cleared, and then the contents of the counter 63 are fed to the write/read circuit 92. On detecting the sector address coincident with the contents of the counter 63, the write/read circuit 92 reads out the write flag section, data section, data check code section, defective sector address section and defective sector address check code section of that alternative sector. The contents of the defective sector address section and data section are stored through the error detection/correction circuit 61 in the memory locations 71 and 72 addressed by the counter 67. The error detection/correction circuit 61 tests the alternative sector and issues the error signal if it is defective based on the same criterion as used in the checking operation for the alternative sectors. The error signal is set to the memory location 73 addressed by the counter 67, or the memory location is reset when the error signal is not created. After one alternative sector has been read out, the counters 36 and 67 are incremented by one, and then the next alternative sector is read out and the same operations as for the previous sector take place. During the foregoing operations, the contents of the counter 63 are compared with the contents of the register 68 by the comparator 69. In the absence of the coincidence signal from the comparator 69, the read operation for the alternative sectors and the write operation for the memories 71, 72 and 73 take place repeatedly. On receiving the coincidence signal from the comparator 69, the controller 51 terminates the read operation for the alternative sectors.

The foregoing read operation for the alternative sectors takes place each time the write command has been executed. Accordingly, the memories 71 and 72 store the contents of the data sections and sector address sections of alternative sectors for all defective sectors which have been detected during the execution of the write command, and are ready for the read command issued by the central processing unit. The operations following the issue of the read command in this state are as follows. First, the counters 54 and 59 and the memory 60 are cleared. Then, the write/read circuit 92 reads out as many sectors as the number indicated by the sector range register 53 starting with a sector corresponding to the sector address set in the sector address register 52. The bit positions of the memory 60 corresponding to defective sectors are set. Following these operations which are identical to those of the checking operation, 512-byte data read out of the data section of each sector is written in the memory 55. The writing for 512-byte data to the memory 55 may be achieved by writing the memory location addressed by the counter 54 and incrementing the counter 54 cyclically until the low order 9 bits of the counter 54 become zero. On detecting the coincidence of the high order 6 bits of the counter 54 with the contents of the sector range register 53, the controller 51 terminates the read operation.

The read operation is immediately followed by the following operations. First, the counters 54, 59 and 67 are cleared. Then, the memory location 60 addressed by the counter 59 is read, and if the bit position of the memory is found "0", the counter 59 is incremented. If the bit position of the memory 60 is found "1", the contents of the sector address register 52 is added to the contents of the counter 59 by an adder 65, and the output of the adder is fed to a comparator/detector 70. The memory locations 71 and 73 addressed by the counter 67 are read and delivered to the comparator/detector 70. The comparator/detector 70 provides an output signal when the output of the adder 65 coincides with data from the memory 71 and, at the same time, data from the memory 73 is "0". If the comparator/dectector 70 does not provide the signal, the counter 67 is incremented by one, and the memories 71 and 73 are read again. If the comparator/detector 70 provides the signal, a gate circuit 74 is satisfied and a 512-byte block in the memory location 72 addressed immediately by the counter 67 is read out and stored in the memory 55. In this case, the contents of the counter 59 are transferred to the high order 6 bits of the counter 54. The memory location addressed by the counter 54 and the counter 54 is incremented cyclically until the low order 9 bits of the counter 54 become zero again.

When the low order 9 bits of the counter 54 become zero, the counters 59 and 67 are incremented by one. Updating for the counter 59 is halted again when the memory 60 reads out "0", and a block of the memory 72 is transferred to the memory 55 in the same way as before. At the time when the counter 59 restores zero, all data from the data sections of defective sectors stored in the memory 55 are replaced with data from the memory 72, i.e., correct data from the data sections of alternative sectors. Then, the counter 54 is cleared, and the memory location 55 addressed by the counter 54 is read out and the counter 54 is incremented cyclically. Data read out of the memory 55 is transferred to the central processing unit. During the above operation, the controller 51 compares the high order 6 bits of the counter 54 with the contents of the sector range register 53, and terminates the read operation for the memory 55 when both data coincide with each other.

These are the operations for executing the read command. The controller 51 informs the central processing unit that the execution of the read command has been completed.

According to the foregoing arrangement for the memory, wherein all data recorded in the data section of alternative sectors is stored in the memory 72 which is accessible at a high speed, data can be read out quickly on request, while it would intrinsically be necessary to read out the alternative sector. In consequence, data requested by the central processing unit can be delivered in a short time, and the performance of the disk memory as a whole is improved.

In the foregoing embodiment, alternative sectors are read out each time the write command has been executed, however, this is not always necessary. For example, alternative sectors may be read out after several write commands have been executed. In this case, however, all data recorded in the data section of alternative sectors might not be completely saved in the memory 72, and thus data from defective sectors could possibly be read out into the memory 55 without correcting possible errors. Therefore, in this case, alternative sectors are read out at that point of time based on the fact that the comparator/detector 70 has provided no output.

The read operation for the alternative sectors may be initiated after the system is turned on or a disk is mounted. That is, even if the contents stored in the memories 71, 72 and 73 were lost because the system had been turned off, or contents in the memories 71, 72 and 73 were invalid because a different disk had been mounted, when turning the system on again or when mounting another disk, the contents in the memories can become valid if the read operation for an alternative sector can be carried out.

By the way, in the case of executions of read commands, explanation was made on the case where firstly a read operation for the drive unit 2 is carried out and then a read operation for the memory 72 is carried out. However, in the case when the value set in the sector range register 53 is "1", the above control may be carried out in the following manner. That is, firstly the content in the sector address register 52 is given as it is to the comparator/detector 70, and it is checked to see if there is present data in a sector to be accessed in the memory 72 in the manner mentioned above. And if present, the corresponding block is read out of the memory 72, and the data to have been read out is transferred to the central processing unit. And if not present, the corresponding sector is read out of the drive unit 2 in the aforementioned manner, and the data to have been read out is transferred to the central processing unit. That way, data in a sector to be accessed can be directly read out of the memory 72 in the case where the data happens to be stored in the memory 72, whereby the effect of an increased read-out speed can be obtained.

In the foregoing description, the number of alternative tracks is assumed to be one, however, a plurality of alternative tracks may be provided. In this case, the arrangement may be made so that another track number is set in the register 62 and the register 68 is cleared on detecting that the contents of the register 68 exceed the number of alternative sectors on one track during the write operation for the alternative sectors. In this case, the memories 71, 72 and 73 need to have an increased capacity as much as a multiple of the number of alternative tracks.

Also in the above description, alternative sectors are located on a common track, however, they may be located separately on many tracks. For example, an alternative sector may be provided at a specific position on the same track as of the defective sector. In this case, the track number of the sector address register 52 is directly fed to the head driver 91 and a specific value is set into the register 68 in the write operation for the alternative sectors.

Alternative sectors may be provided on both of the common track and the same track as that of the defective sector. In any case, an arrangement is made so that used alternative sectors can be recognized, and the track number and sector number of each alternative sector are set in the register 62 and counter 63, respectively, in the read operation for alternative sectors.

The embodiment has been described on assumption that sectors are not located separately on a plurality of tracks when the number of sectors indicated by the register 53 is more than one. However, the number of sectors need not be limited for a system where the disk has a continuous helical track and the head can trace the track automatically. In this case, the data transfer ability by one write or read command can be enhanced by provision of a larger capacity for the memory 55.

Although the fixed length data recording system based on the unit of a sector has been described, the present invention is also applicable to a variable length data recording system including the count section and key section based on the unit of a record.

We claim:

1. A memory system having an information recording area for storing information and an alternative area for storing information replacing information stored as defective information in a defective location in said information recording area and the address of the defective location, said system comprising:

(a) first reading-out means for reading out all of the information recorded on said alternative area;
(b) memory means for storing information and including a memory capable of being read out at a higher speed than the speed at which said first reading-out means reads out the information recorded on said alternative area;
(c) address information storing means for storing addresses at which said defective information is stored in said information recording area;
(d) writing means for writing in said memory means information read out from said alternative area by said first reading-out means;
(e) second reading-out means for reading out data from said information recording area in response to a reading-out requesting address;
(f) checking means for checking to see if there is present in said address information storing means an address which coincides with a reading-out requesting address for said information recording area;
(g) third reading-out means for reading out from said memory means information designated by the address which is determined to coincide with said reading-out requesting address by said checking means; and
(h) means for controlling the writing operation of said writing means so that said writing operation is carried out prior to the reading operation for said information recording area.

2. A memory system according to claim 1, wherein said information recording area and said alternative area are formed on a rotatable optical disk, and said alternative area is located on a track other than that of said information recording area.

3. A memory system having an information recording area for storing information and an alternative area for storing information replacing information stored as defective information in a defective location in said information recording area and the address of the defective location, said system comprising:

(a) first writing means for writing information in said alternative area;
(b) memory means for storing information and including a memory capable of being read out at a higher speed than the speed at which information is read out from said alternative area;
(b') second writing means for writing in said memory means the same information as said information to be written by said first writing means;
(c) address information storing means for storing addresses at which said defective information is stored in said information recording area;
(d) first reading-out means for reading out data from said information recording area in response to a reading-out requesting address;
(e) checking means for checking to see if there is present in said address information storing means an address which coincides with a reading-out requesting address for said information recording area;

(f) second reading-out means for reading out from said memory means information designated by the address which is determined to coincide with said reading-out requesting address by said checking means; and (g) means for controlling the writing operation of said second writing means so that said writing operation is carried out prior to the reading operation for said information recording area.

4. A memory system according to claim 3, wherein said information recording area and said alternative area are formed on a rotatable optical disk, and said alternative area is located on a track other than that of said information recording area.

* * * * *